Aug. 27, 1935. S. O. DODGE 2,012,713
BEARING PIN FOR TEMPLE ROLLS
Filed June 13, 1934
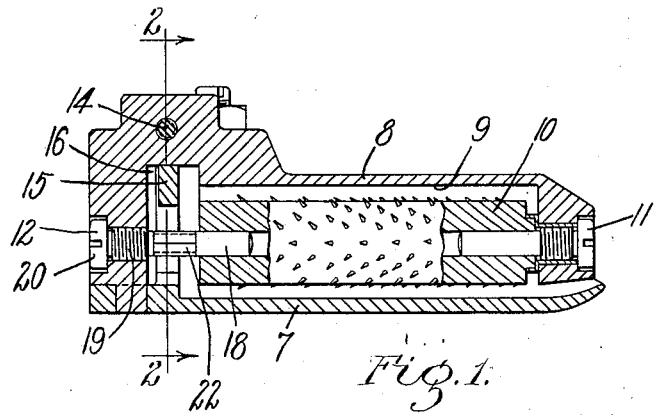
Fig. 1.
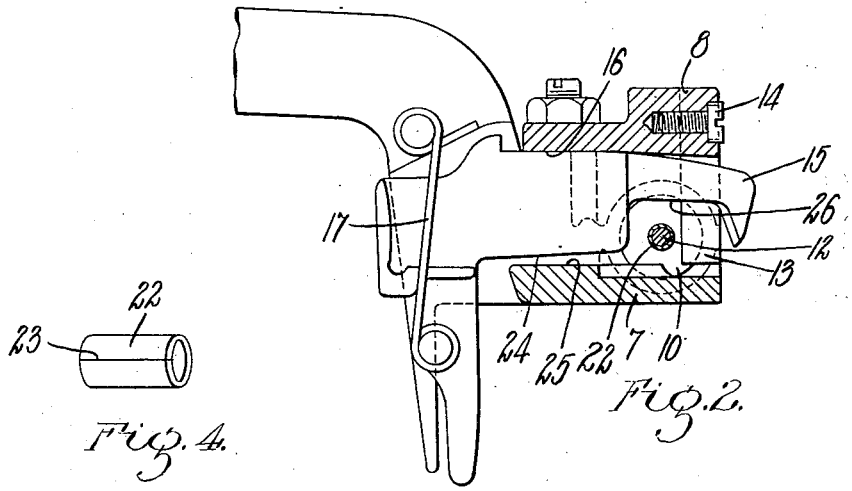
Fig. 2.
Fig. 4.
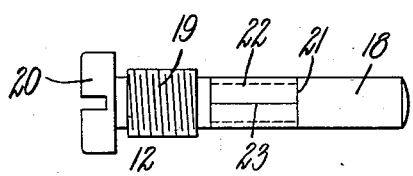
Fig. 3.
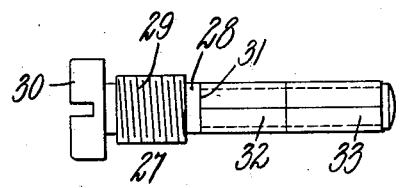
Fig. 5.
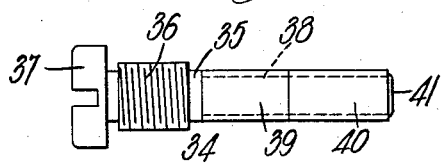
Fig. 6.
Inventor:
Sherwood O. Dodge.
by Franklin E. Low Att'y.

Patented Aug. 27, 1935

2,012,713

UNITED STATES PATENT OFFICE 2,012,713

BEARING PIN FOR TEMPLE ROLLS

Sherwood O. Dodge, Medford, Mass., assignor to Guaranteed Parts, Inc., Allston, Mass., a corporation of Massachusetts Application June 13, 1934, Serial No. 730,448

4 Claims. (Cl. 139—297)

This invention relates to an improvement in bearing pins for temple rolls.

Certain types of temple rolls for looms are rotatably mounted at their opposite ends upon separate bearing pins. In thread-cutting temples one of these bearing pins is located directly beneath a portion of the movable knife. Normally, before any of the parts of the temple have been subjected to wear there is ample clearance between a lower edge portion of the movable knife and the bearing pin located therebeneath, so that these parts do not contact one with another. Continual sliding contact, however, between another lower edge portion of the movable knife and a surface of the temple bar eventually results in sufficient wear to these members, particularly the surface of the bar, to cause the knife to gradually move downwardly in the bar as the wear progresses until the knife finally contacts with the bearing pin, whereupon further continued use of the temple will also wear the pin until said pin is eventually severed by the knife. It is evident that when a temple bar has become worn to such an extent that the knife contacts with the bearing pin that if the bar is not replaced immediately the bearing pin will wear quickly and must necessarily be replaced frequently.

The object of this invention is to provide a bearing pin of novel construction having a sleeve constituting a roller mounted thereon and positioned to be engaged and rotated by the movable knife in the event that the temple bar becomes worn sufficiently to permit said knife to engage the roller, said roller also being constructed of a material which will resist wear for a longer period than is possible with the material of which the pin itself is usually constructed.

Another object of the invention is to provide a bearing pin having a roller embodied therein of a diameter approximating that of the bearing portion of the pin, thereby making it possible to insert the pin in the top of cover member of the temple bar and remove said pin therefrom in exactly the same manner as has been the custom with the pins heretofore in use.

Still another object of the invention is to provide a roller which may be sprung on or off the body portion of the bearing pin.

The invention consists in an improved bearing pin for temple rolls as set forth in the following specification and particularly as pointed out in the claims thereof.

Referring to the drawing:—

Fig. 1 represents a sectional elevation of a thread-cutting temple, said section being taken on the longitudinal median line of the temple roll, one end of the latter being mounted upon a bearing pin embodying my invention.

Fig. 2 is a vertical sectional elevation taken on the line 2—2 of Fig. 1 looking in the direction of the arrows on said line.

Fig. 3 is a front elevation of the bearing pin embodying my invention illustrated upon an enlarged scale.

Fig. 4 is a perspective view of a roller provided for the bearing pin.

Figs. 5 and 6 are front elevations similar to Fig. 3 illustrating modified embodiments of my invention.

Like numerals refer to like parts throughout the several views of the drawing.

In the drawing, referring particularly to Figs. 1 to 4 inclusive, 7 represents a portion of a temple bar of well-known form and 8 is a top or cover member for said bar. Located within a space 9 provided between the bar 7 and cover 8 is a temple roll 10, well known in the art. The outer end portion of the roll 10 is rotatably mounted upon a bearing pin 11 and the inner end of said roll is rotatably mounted upon a bearing pin 12, which pin constitutes the device of this invention.

A stationary knife blade 13 of well-known form is secured by means of a screw 14 to the cover 8, and a movable knife 15 is mounted in a well-known manner to both rock and slide in a groove 16 provided therefor in the cover 8. A spring 17 is provided for the movable knife 15 and acts to always return said knife to its normal position whenever said knife is moved from said position.

In the operation of the device a combined rocking and sliding movement is imparted to the knife 15, said knife first being rocked in a well-known manner from a normal position as illustrated in Fig. 2 until an edge 24 thereof contacts with a surface 25 of the bar 7. The knife then slides rearwardly in the groove 16 with the surface 24 of said knife still in contact with the surface 25 of the bar. These contacting surfaces 24 and 25 are never lubricated and it is evident that both surfaces will in time become considerably worn and eventually a surface 26 of the knife will contact with the periphery of the bearing pin 12. Heretofore when this condition of affairs existed the old type bearing pin immediately began to wear away and this wear progressed until the pin was worn to such an extent that it finally broke at the point of contact.

Applicant's bearing pin 12 is constructed and arranged to reduce the friction and consequent wear resulting from the contact of the knife 15 with the bearing pin 12 and constitutes the device of the present invention. This bearing pin 12 is mounted in the cover 8 and embodies therein a cylindrical bearing portion 18 which projects into the temple roll 10 and upon which one end of said roll rotates; a portion 19 which has screw-threaded engagement with the cover, and a head 20. An annular groove 21 is formed in the periphery of the bearing portion 18 and in this groove a sleeve 22, constituting a roller, is rotatably mounted. The roller 22 is constructed of spring steel and is of approximately the same outside diameter as the cylindrical portion 18 of the pin. The roller 22 is furthermore split at 23 in order that it may be expanded and sprung into the groove 21. When the bearing pin 12 is in position in the cover 8, the roller 22 is located directly beneath and in the path of the knife 15, and when the surfaces 24 and 25 of the knife and bar respectively become worn to such an extent that the surface 26 of the knife engages the roller 22, said roller will be caused to rotate upon the pin, thereby reducing the friction and eliminating much of the wear, and it is evident that as the wear upon the pin is reduced that the wear between the surfaces 24 and 25 will also be reduced. It is furthermore evident that if after long continued wear the roller 22 does become worn to such an extent that it is necessary that it be replaced, such replacement may be accomplished with little trouble and at small expense.

In Fig. 5 I have illustrated a modified embodiment of my invention in which 28 constitutes a cylindrical bearing portion, 29 a screw-threaded portion and 30 a head. An annular groove 31 is formed in the periphery of the cylindrical portion 28, and in this groove split sleeves 32 and 33, constituting rollers, similar to the sleeve 23 previously described, are mounted side by side. The sleeve 32 is positioned upon the pin 27 for the purpose of being engaged by a knife 15 and when so engaged will rotate and reduce the friction and wear between the contacting surfaces. The sleeve 33 projects into the temple roll 10 and constitutes a bearing member therefor. The diameter of the sleeves 32 and 33 is preferably approximately the same as that of the cylindrical portion 28.

In Fig. 6 still another modified embodiment of the invention is illustrated in which a bearing pin 34 embodies therein a cylindrical portion 35, a screw-threaded portion 36 and a head 37. The cylindrical portion 35 is reduced in diameter at 38, and rotatably mounted upon this reduced portion are sleeves 39 and 40 constituting rollers. The rollers 39 and 40 are held in position upon the reduced portion 38 of the pin by expanding or heading an end portion 41 of the pin after the rollers have been mounted thereon in a manner to prevent longitudinal movement of the rollers on the pin and in effect the rollers are mounted in a groove upon the cylindrical portion 35 of the pin in the same manner as are the rollers illustrated in Fig. 5. The rollers 39 and 40 are solid and are approximately the same diameter as the cylindrical portion 35. The bearing pin 34 functions in exactly the same manner as does the pin 27, the difference being that the rollers 39 and 40 are solid whereas the rollers 32 and 33 are split.

In each of the various embodiments of this invention the diameter of the sleeves or rollers is less than the inside diameter of the screw-threaded hole in the cover 8 which receives the screw-threaded portion of the bearing pin, and it is therefore evident that each bearing pin may be inserted in and removed from said cover in exactly the same manner as has been the custom with the bearing pins heretofore in common use.

I claim:—

1. A bearing pin for temple rolls embodying therein a screw-threaded portion and a plain bearing portion, the latter being provided with an annular groove therein, and a roller mounted in said groove and adapted to rotate therein when engaged by a temple knife, the diameter of said roller being approximately the same as the extreme diameter of said bearing portion.

2. A bearing pin for temple rolls comprising a screw having a plain bearing portion embodied therein, the latter being provided with an annular groove extending around the periphery thereof, and a roller of a diameter approximating the extreme diameter of said bearing portion mounted in said groove and adapted to be engaged by a temple knife, said roller being constructed of spring metal and split longitudinally thereof, whereby it may be expanded and sprung into said groove.

3. A bearing pin for temple rolls comprising a screw having a plain bearing portion embodied therein, the latter being provided with an annular groove extending around the periphery thereof, and a pair of rollers mounted side by side in said groove, one of said rollers being adapted to rotate when engaged by a temple knife and the other roller constituting a bearing member for a temple roll.

4. In a loom temple a temple bar, a cover therefor provided with a screw-threaded hole therein, a bearing pin for a temple roll mounted in said cover, said pin having screw-threaded engagement with said hole and having a plain bearing portion embodied therein provided with a groove extending therearound, and a roller of a diameter approximating the extreme diameter of said bearing portion mounted in said groove and adapted to be engaged by a temple knife, said bearing portion and the roller thereon being insertable through said screw-threaded hole.

SHERWOOD O. DODGE.